US009634977B2

(12) United States Patent
Govindaraman

(10) Patent No.: US 9,634,977 B2
(45) Date of Patent: Apr. 25, 2017

(54) SYSTEMS AND METHODS OF REDACTIVE MESSAGING

(71) Applicant: salesforce.com, inc., San Francisco, CA (US)

(72) Inventor: Ashwini Govindaraman, Hayward, CA (US)

(73) Assignee: salesforce.com, inc., San Francisco ( * ) Notice: Subject to any disclaimer, the term of this patent is extended or adjusted under 35 U.S.C. 154(b) by 629 days.

(21) Appl. No.: 14/015,989

(22) Filed: Aug. 30, 2013

(65) Prior Publication Data

US 2014/0095634 A1    Apr. 3, 2014

Related U.S. Application Data

(60) Provisional application No. 61/708,385, filed on Oct. 1, 2012.

(51) Int. Cl.
*H04L 12/58* (2006.01)
*G06F 21/62* (2013.01)

(52) U.S. Cl.
CPC ......... *H04L 51/32* (2013.01); *G06F 21/6245* (2013.01)

(58) Field of Classification Search
CPC ......... H04L 51/12; H04L 51/16; H04L 51/32; H04L 12/60; H04L 67/306; H04L 63/061; H04L 63/0442; H04L 63/0435; H04L 63/0428; H04L 63/123; H04L 12/1895; H04L 12/58; H04L 61/25
See application file for complete search history.

(56) References Cited

U.S. PATENT DOCUMENTS

| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |

(Continued)

OTHER PUBLICATIONS

Twitter Facebook Integration (Cross-posting)—Sep. 14, 2011; Twitter Help Center Webpage, © 2011 Twitter—retried using WAYBACK.*

(Continued)

*Primary Examiner* — Saket K Daftuar
(74) *Attorney, Agent, or Firm* — Haynes Beffel & Wolfeld LLP; Ernest J. Beffel, Jr.

(57) ABSTRACT

The technology disclosed relates to embedding private comments in public messages. In particular, it relates to customizing public messages by including private comments that are directed to specific recipients. The private comments are included in the context of the public messages sent to their intended recipients but excluded from the public message when it is sent to other recipients. The private comments can be viewable only to their intended recipients and in the context of the public response. The public response as seen by recipients not intended to receive private comments does not include the private comments. This enables a sender of a private comment to efficiently communicate selected information to specific recipients without burdening all recipients with information which may not be relevant for them. Furthermore, it preserves the overall context of the original message.

16 Claims, 10 Drawing Sheets

(56) References Cited

U.S. PATENT DOCUMENTS

| | | |
|---|---|---|
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,083,083 A | 7/2000 | Nishimura |
| 6,092,083 A | 7/2000 | Brodersen et al. |
| 6,161,149 A | 12/2000 | Achacoso et al. |
| 6,168,534 B1 | 1/2001 | Schultz |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,396,605 B1 | 5/2002 | Heflinger et al. |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,851,004 B2 | 12/2010 | Hirao et al. |
| 7,870,204 B2 * | 1/2011 | LeVasseur ............ H04L 63/306 709/204 |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 8,959,440 B2 * | 2/2015 | Pike ........................ H04L 51/04 715/753 |
| 2001/0027388 A1 | 10/2001 | Beverina et al. |
| 2001/0044791 A1 | 11/2001 | Richter et al. |
| 2002/0002986 A1 | 1/2002 | Jones et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0074418 A1 | 6/2002 | Smith |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187321 A1 | 10/2003 | Hoffmann et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |

(56) References Cited

U.S. PATENT DOCUMENTS

| | | |
|---|---|---|
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0005240 A1 | 1/2008 | Knighton et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0064015 A1* | 3/2010 | Sacks ............... G06Q 10/10 709/206 |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0130910 A1 | 5/2012 | Al-Alami |
| 2012/0173550 A1* | 7/2012 | Boullery ........... G06F 17/30038 707/750 |
| 2012/0233137 A1 | 9/2012 | Jakobson et al. |
| 2012/0284618 A1* | 11/2012 | Bailor ............... G06Q 10/101 715/255 |
| 2012/0290407 A1 | 11/2012 | Hubbard et al. |
| 2013/0031162 A1* | 1/2013 | Willis ............... H04L 67/02 709/203 |
| 2013/0212497 A1 | 8/2013 | Zelenko et al. |
| 2013/0247216 A1 | 9/2013 | Cinarkaya et al. |
| 2014/0095597 A1* | 4/2014 | McNeil ............... G06Q 50/01 709/204 |
| 2014/0149887 A1* | 5/2014 | Bejar ............... G06Q 50/01 715/753 |
| 2014/0207611 A1* | 7/2014 | Cleary ............... G06Q 30/0633 705/26.8 |

OTHER PUBLICATIONS

Final Rejection Office Action, U.S. Appl. No. 13/093,478 (non HBW), dated Oct. 16, 2013, 13 pages.

Non Final Rejection Office Action, U.S. Appl. No. 13/093,478 (non HBW), dated May 3, 2013, 13 pages.

U.S. Appl. No. 13/093,478—Response to Office Action dated May 3, 2013 filed Jul. 31, 2013, 9 pages (non-HBW).

U.S. Appl. No. 13/093,478—Response to Final Office Action dated Oct. 16, 2013 filed Feb. 18, 2014, 10 pages (non-HBW).

U.S. Appl. No. 13/093,478—Response to Final Office Action dated Nov. 18, 2016, 21 pages.

* cited by examiner

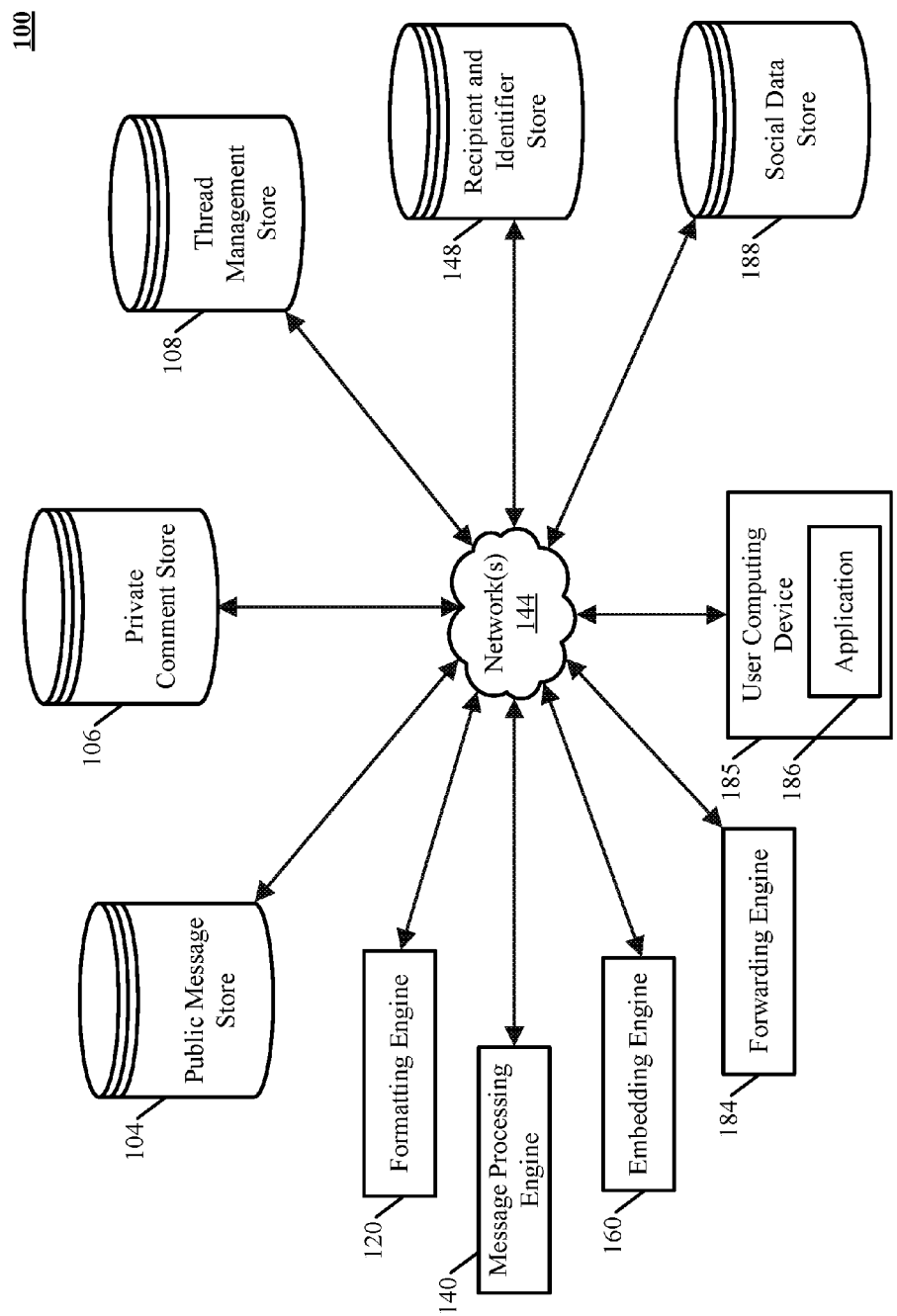
FIG. 1 – Redactive Messaging Environment

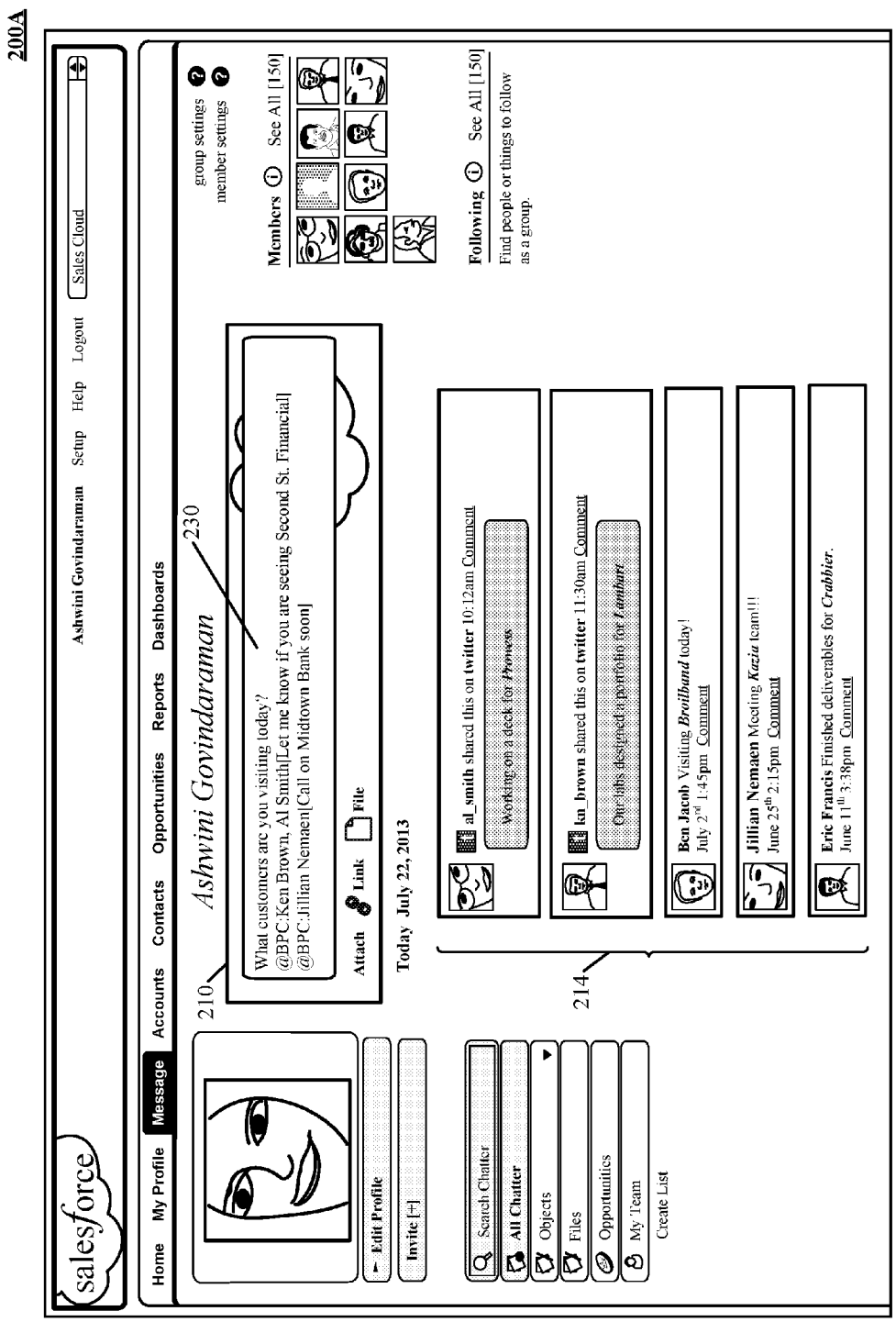
FIG. 2A – Social Interface

FIG. 2B – Social Interface

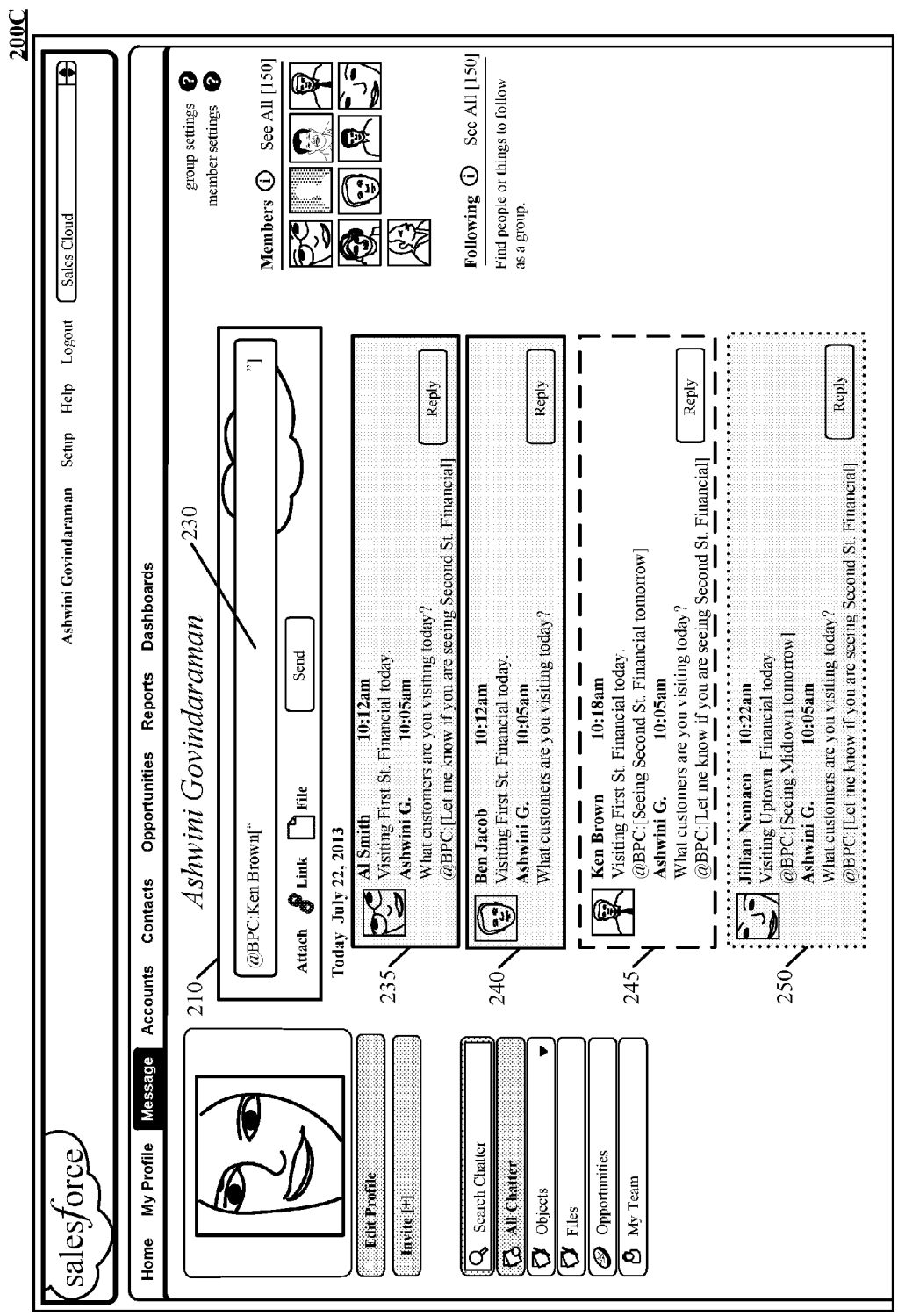
FIG. 2C – Social Interface

300 salesforce

Ashwini Govindaraman  Help  Logout

COMPOSE

Inbox (123)
Sent
Drafts
Spam
Trash

| Reply | Forward | Delete | Move | Search | Contacts | Settings |

EMail

| | Sender | Subject | Date |
|---|---|---|---|
| ☐ | Jillian Nemaen 310 | Customer Visits Today<br>Visiting UptownFinancial today.<br>@BPC:[Seeing Midtown tomorrow] | 10:22am, Today |
| | | Ashwini G.<br>What customers are you visiting today?<br>@BPC:[Call on Midtown Bank soon – they use our latest products and are merging with Bank of Atlantis]] | 10:05am, Today |
| ☐ | Ken Brown 320 | Customer Visits Today<br>Visiting First St. Financial today.<br>@BPC:[Seeing Second St. Financial tomorrow] | 10:18am, Today |
| | | Ashwini G.<br>What customers are you visiting today?<br>@BPC:[Let me know if you are seeing Second St. Financial] | 10:05am, Today |
| ☐ | Ben Jacob 330 | Customer Visits Today<br>In the office today | 10:12am, Today |
| ☐ | Al Smith 340 | Customer Visits Today<br>Visiting Infinite investors today. | 10:12am, Today |
| | | Ashwini G.<br>What customers are you visiting today?<br>@BPC:[Let me know if you are seeing Second St. Financial] | 10:05am, Today |

FIG. 3 – Business Interface

400

Public Message Objects 420

| ThreadID | MessageID | Timestamp | AuthorID | PublicMessage |
|---|---|---|---|---|
| 0123 | 0054 | 130722:1005 | 1001 | What customers are you visiting today? |
| 0123 | 0055 | 130722:1012 | 1003 | Visiting Infinite investors today. |
| 0123 | 0056 | 130722:1012 | 1005 | In the office today. |
| 0123 | 0057 | 130722:1018 | 1002 | Visiting First St. Financial today. |
| 0123 | 0058 | 130722:1022 | 1004 | Visiting Uptown Financial today. |

Private Message Objects 440

| ThreadID | MessageID | BPC_ID | PrivateComments |
|---|---|---|---|
| 0123 | 0054 | 0001 | Let me know if you are seeing Second St. Financial. |
| 0123 | 0054 | 0002 | Call on Midtown Bank soon. |
| 0123 | 0057 | 0003 | Seeing Second St. Financial tomorrow. |
| 0123 | 0058 | 0001 | Seeing Midtown tomorrow. |

Recipient Objects 460

| ThreadID | MessageID | BPC_ID | RecipientID(UserID) |
|---|---|---|---|
| 0123 | 0054 | 0001 | 1002 |
| 0123 | 0054 | 0001 | 1003 |
| 0123 | 0054 | 0002 | 1004 |
| 0123 | 0057 | 0001 | 1001 |
| 0123 | 0057 | 0001 | 1003 |
| 0123 | 0058 | 0001 | 1001 |

User Objects 480

| UserID | DisplayName | EmailAddress | ChatterName | FB_Name | TW_Name |
|---|---|---|---|---|---|
| 1001 | Ashwini Govindaraman | ashwinig@sforce.com | ashwini_ch | ashwinig_fb | ashwinig_tw |
| 1002 | Ken Brown | kenb@sforce.com | kenb_ch | kenb_fb | kenb_tw |
| 1003 | Al Smith | asmith@sforce.com | asmith_ch | amsith_fb | asmith_tw |
| 1004 | Jillian Nemaen | jnemaen@sforce.com | jnemaen_ch | jnemaen_fb | jnemaen_tw |
| 1005 | Ben Jacob | bjacob@sforce.com | bjacob_ch | bjacob_fb | bjacob_tw |

FIG. 4 – Schema of Redactive Messages

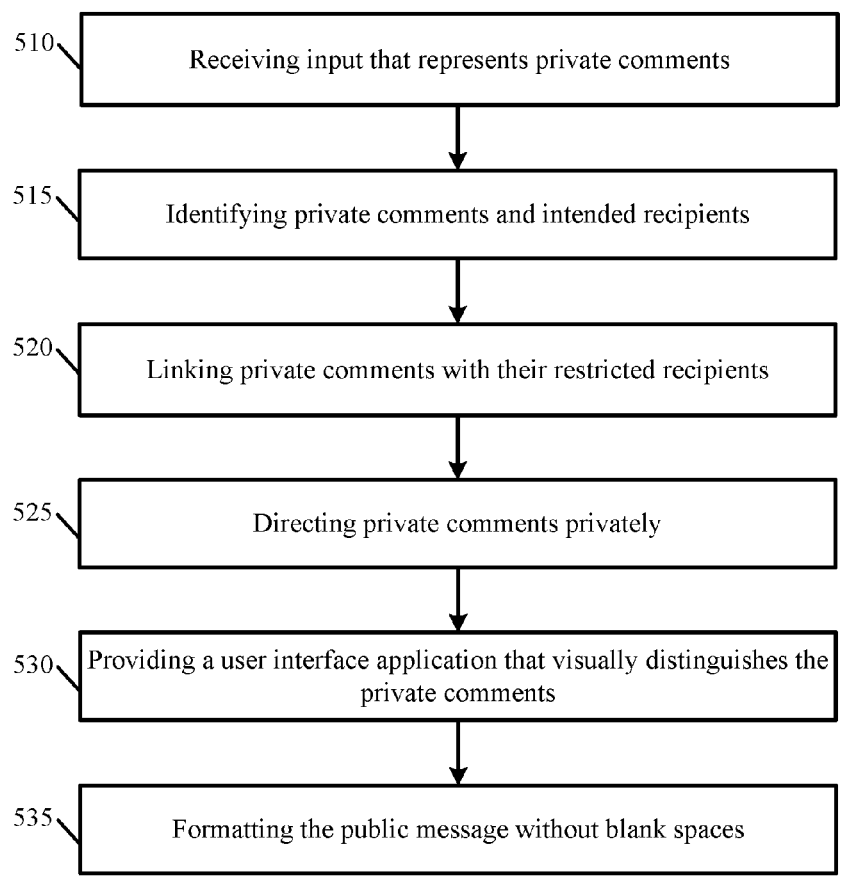
FIG. 5 – Flowchart of Embedding Private Comments in Public Messages

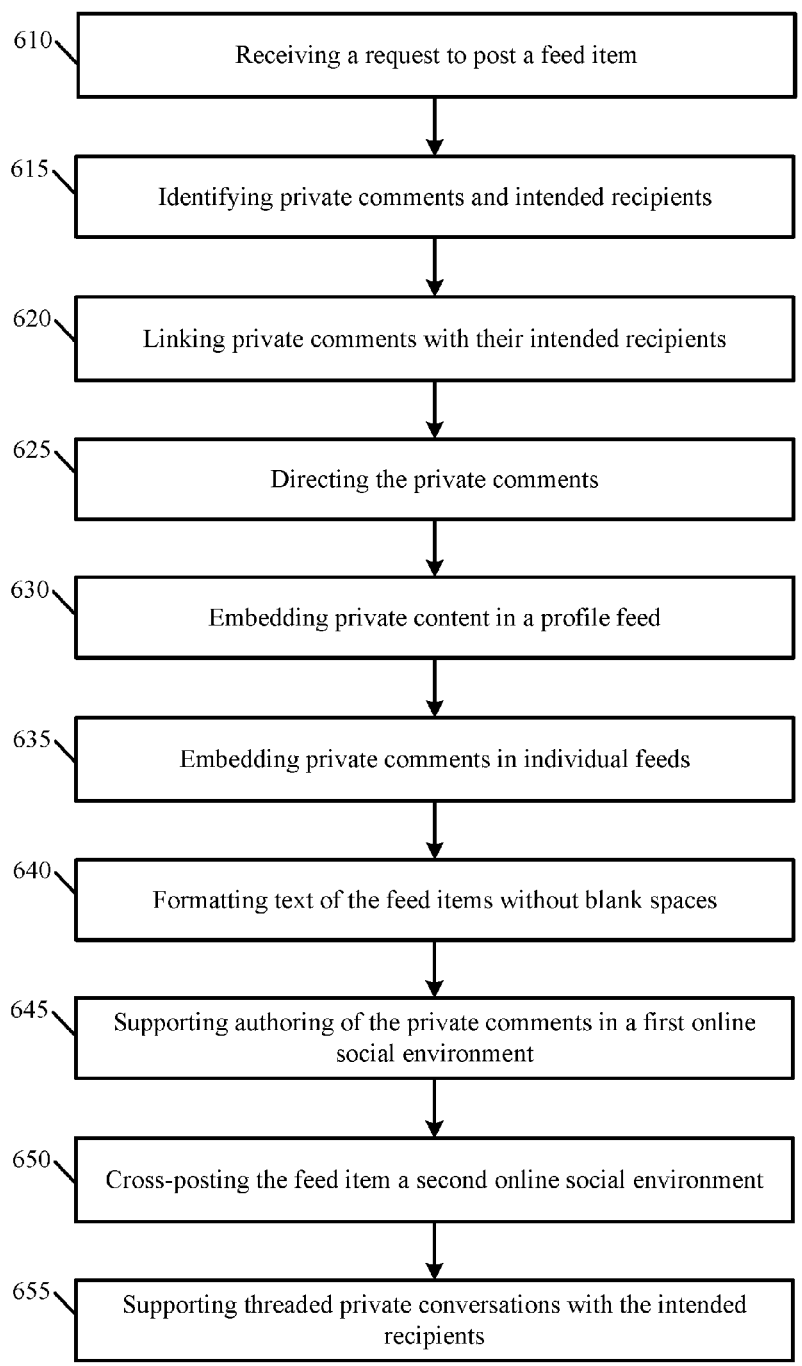
FIG. 6 – Flowchart of Posting Private Comments in Online Social Environments

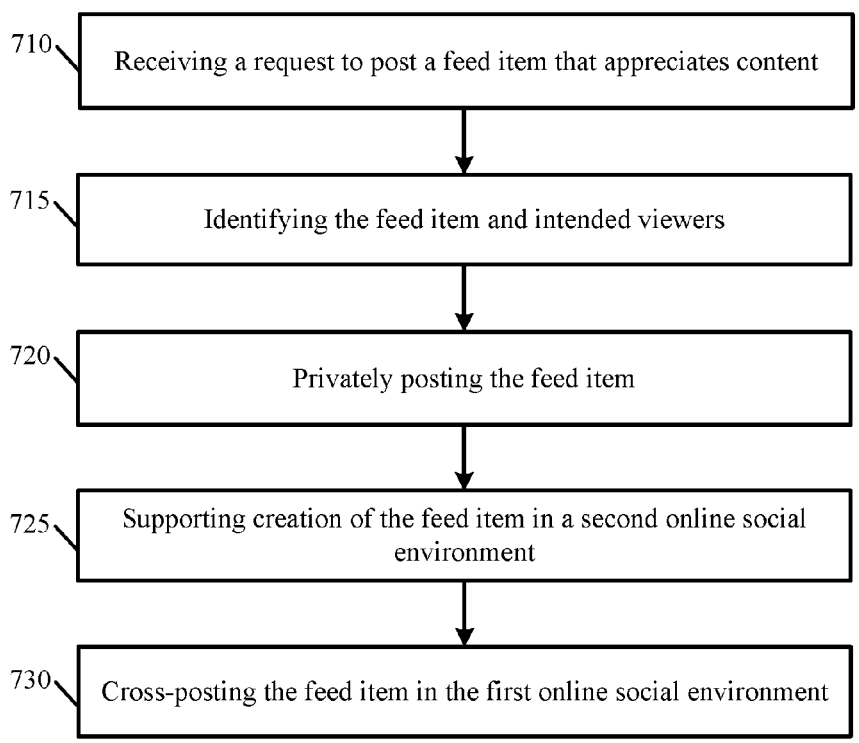
FIG. 7 – Flowchart of Privately Appreciating Content Posted in an Online Social Environment

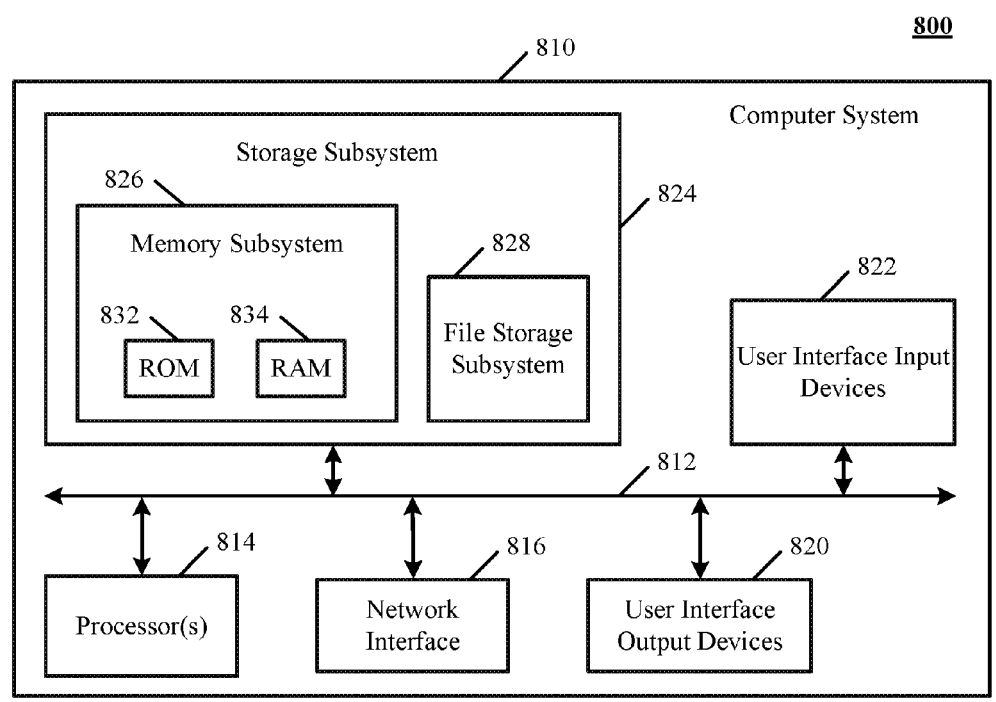
FIG. 8 – Computer System

SYSTEMS AND METHODS OF REDACTIVE MESSAGING

RELATED APPLICATION

The application claims the benefit of U.S. provisional Patent Application No. 61/708,385, entitled, "System and Method for Message Management System," filed on Oct. 1, 2012. The provisional application is hereby incorporated by reference for all purposes.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

The technology disclosed relates to embedding private comments in public messages. In particular, it relates to customizing public messages by including private comments that are directed to specific recipients. The private comments are included in the context of the public messages sent to their intended recipients but excluded from the public message when it is sent to other recipients. The private comments can be viewable only to their intended recipients and in the context of the public response. The public response as seen by recipients not intended to receive private comments does not include the private comments. This enables a sender of a private comment to efficiently communicate selected information to specific recipients without burdening all recipients with information which may not be relevant for them. Furthermore, it preserves the overall context of the original message.

Traditional email services and online social environments display messages, posts and responses to all their addressees and subscribers. In this sense, a user's responses are public in that they are seen in total by all recipients. However, a user may wish to send a general response to all of the original recipients but include comments directed only to specific recipients.

Accordingly, it is desirable to provide systems and methods that allow a user to embed private comments into public responses. Improved communication and user experience may result.

SUMMARY

The technology disclosed relates to embedding private comments in public messages. In particular, it relates to customizing public messages by including private comments that are directed to specific recipients. The private comments are included in the context of the public messages sent to their intended recipients but excluded from the public message when it is sent to other recipients. The private comments can be viewable only to their intended recipients and in the context of the public response. The public response as seen by recipients not intended to receive private comments does not include the private comments. This enables a sender of a private comment to efficiently communicate selected information to specific recipients without burdening all recipients with information which may not be relevant for them. Furthermore, it preserves the overall context of the original message.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 1 shows an example environment of redactive messaging.

FIGS. 2A-2C illustrate a social interface of redactive messaging in an online social environment.

FIG. 3 illustrates a redactive messaging business interface in an online business environment.

FIG. 4 shows one implementation of a plurality of objects that can be used for managing data underlying redactive messaging.

FIG. 5 illustrates a flowchart of one implementation of embedding private comments in public messages.

FIG. 6 is a flowchart of one implementation of posting private comments in online social environments.

FIG. 7 is a flowchart of one implementation of privately appreciating content posted in an online social environment.

FIG. 8 is a block diagram of an example computer system for redactive messaging.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

The technology disclosed relates to redactive messaging, i.e., redacting messages in the sense of editing and preparing them for publication and distribution in a computer-implemented system. The technology disclosed can be implemented in the context of any computer-implemented system including a database system, a multi-tenant environment, or the like. Moreover, this technology can be implemented using two or more separate and distinct computer-implemented systems that cooperate and communicate with one another. This technology may be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

The technology disclosed relates to editing and preparing messages for publication and distribution in networked systems. In particular, it relates to customizing public messages by allowing an author to add comments directed specifically to one or more individual recipients. This is done in a private manner so as not to burden all recipients with the comments, which may not apply or be of interest to them. The term "redactive messaging" is used to describe this capability.

The technology disclosed relates to selecting and identifying specific user-desired text within a larger text message, selecting and identifying desired message recipients of the specific user-desired text and sending the specific user-desired text in the context of the larger text message to the desired message recipients while sending only the larger text message without the specific user-desired text to other message recipients. The specific user-desired text is effectively redacted from the public message.

Advantages that may accrue include reducing content in public messages that may be relevant for only a small number of recipients, calling attention to specific information in a public message that is of particular interest to a subset of recipients, posing questions to specific recipients about selected items and information in a public message, reducing the number of additional messages that may be required to communicate about specific content in a public message that applies only to a subset of recipients, creating separate message threads within the context of a public message thread, etc.

Redactive Messaging Engines and Datastores

FIG. 1 shows an example environment 100 that includes redactive messaging resources. FIG. 1 illustrates that environment 100 can include communication network(s) 144, which can be any network or combination of networks of devices that communicate with one another. For instance, network(s) 144 can be any one or any combination of Local Area Network (LAN), Wide Area Network (WAN), WiFi, telephone network, wireless network, point-to-point network, star network, token ring network, hub network, peer-to-peer connections like Bluetooth, Near Field Communication (NFC), Z-Wave, ZigBee, or other appropriate configuration including the Internet. A message processing engine 140 can be augmented by a formatting engine 120, an embedding engine 160 and a forwarding engine 184. Data can be stored in the various data stores shown: public message store 104, private comment store 106, thread management store 108, recipient and identifier store 148 and a social data store 188. A user can interact with the system via an application 186 running on a user computing device 185.

In some implementations, the engines can be of varying types including workstations, servers, computing clusters, blade servers, server farms, or any other data processing systems or computing devices. In other implementations, the data stores can be relational database management systems (RDBMSs), object oriented database management systems (OODBMSs), distributed file systems (DFS), or any other data storing systems or computing devices.

In some implementations, environment 100 may not have the same elements as those listed above and/or may have other/different elements instead of, or in addition to, those listed above. The different elements can be combined into single software modules and multiple software modules can run on the same hardware.

The public message store 104 can include messages being sent to members of a group, also called recipients. A public message can also be one that is sent to a public website for viewing by anyone who may access that site. The messages can include text created by a user, and other data as well. Examples of messages include posts, status updates, likes, replies, shares, mentions, and comments.

The private comment store 106 can include comments which are sent to a specific subset of recipients in a group as opposed to public comments which are sent to all members of the group. Private comments can be used to avoid burdening unintended recipients with information that may not be relevant to them. Private comments can also be used to coordinate actions among a subset of a group: for instance if a project involves multiple sub-projects then it can be more efficient to send specific private comments to members of the sub-projects as part of an overall public message. This retains the overall context of the public message, while informing selected recipients of information targeted specifically to them. In some implementations, the public message store 104 and private comments store 106 can be part of a single database or message store with private comments specifically marked.

The thread management store 108 can be used to track message threads and the private comments associated with them. A message thread can be a continuous collection of messages related to one topic, question, post, and/or comment. The messages can be collected and stored in the public message store 104. Private comments, which can also be messages, can be stored in the private comment store 106. Thread tracking can be done using a schema such as the one shown in FIG. 4. This allows threads to be associated with their respective messages, comments, authors, and recipients. Threads can be presented in a chronological order. In some implementations, a timestamp can also be associated with a thread. In some implementations, the public message store 104, private comments store 106 and thread management store 108 can be part of a single database.

The recipient and identifier store 148 can include a unique identifier for each user. The identifier can be used to associate a user with messages, threads and comments. Entries in the recipient and identifier store 148 can include a display name for the corresponding user as well as their email addresses and online social handles or usernames. This information can enable a user interface to display a convenient user name while routing messages and comments to users via their email addresses and online social handles.

The social data store 188 can include social media content like social media sources, social accounts, social personas, social profiles, social handles, content shared, feed items, posts, and the like. It can also include a user profile that includes data about the user of a database system. The data can include general information, such as title, phone number, a photo, and biographical summary. The data can include messages created by other users.

Social data store 188 can include a feed that is a combination (e.g. a list) of feed items. A feed item or feed element can include information about a user of the database referred to as a profile feed or about a record referred to as record feed. A user following the user or record can receive the associated feed items. The feed items from all of the followed users and records can be combined into a single feed for the user.

An information feed in the context of a social network is a collection of information selected from the social network for presentation in a user interface. The information presented in the information feed can include entries posted to a user's wall or any other type of information accessible within the social network. For example, a user's news feed can include text inputs such as comments (e.g., statements, questions, emotional expressions), responses to comments (e.g., answers, reactionary emotional expressions), indications of personal preferences, status updates, and hyperlinks. As another example, a news feed can include file uploads, such as presentations, documents, multimedia files, and the like.

A feed item can be a message, post, update stream, and/or a story (also called a feed tracked change). A feed can be a combination of messages and stories. Messages can include text created by a user, and other data as well. Examples of messages include posts, status updates, likes, replies, shares, and comments. Messages can be created for a user's profile or for a record. Posts can be created by various users, potentially any user, although some restrictions can be applied. As an example, posts can be made to a wall section of a user's profile (which can include a number of recent posts) or a section of a record that includes multiple posts. The posts can be organized in chronological order. A comment can be made on any feed item. In one implementation, comments can be organized as a list explicitly tied to a particular story, post, or status update.

Social data store 188 can include a group, which is a collection of users. The group can be defined as users with a same or similar attribute, or by membership. In one implementation, a group feed can include any feed item about any user in a group. In another implementation, a group feed can include feed items that are about the group as a whole. In one implementation, the feed items for a group are only posts and comments.

Social data store 188 can include an entity feed or record feed that refers to a feed of feed items about a particular record in the database, such as stories about changes to the record and posts made by users about the record. An entity feed can be composed of any type of feed item. Such a feed can be displayed on a page (e.g. a web page) associated with the record (e.g. a home page of the record). In other implementations, a profile feed is a feed of feed items about a particular user.

In one implementation, the feed items for a profile feed can be posts and comments that other users make about or send to the particular user, and status updates made by the user. Such a profile feed can be displayed on a page associated with the particular user. In another implementation, feed items in a profile feed can include posts made by the particular user and feed tracked changes (stories) initiated based on actions of the particular user.

In one implementation, a user can make a comment within a user's news feed. Such a comment can propagate to the appropriate profile feed or record feed, and then to the news feeds of the following users. Thus, feeds can include what people are saying, as well as what they are doing. In another implementation, feeds are a way to stay up-to-date (e.g., on users, opportunities, etc.) as well as an opportunity to reach out to co-workers/partners and engage them around common goals.

The message processing engine 140 can be used to send and receive messages and comments. Messages can be formatted using the formatting engine 120. For instance, if a public message includes private comments, then the message processing engine 140 can remove these and use the formatting engine 120 to omit any blank space or processing artifacts so that it is not apparent to viewers that private comments were present.

In one implementation, the message processing engine 140 can be used with the embedding engine 160 and forwarding engine 184 to send messages including private comments to their intended recipients. In one implementation, a public message is retrieved from the public message store 104 and a related private comment is retrieved from the private comment store 106. The embedding engine embeds the private comment into the public message and the forwarding engine 184 send this version of the message to its intended recipients.

The user computing device 185 can include an application 186 that provides a user interface for a user to interact with the other components of the redactive messaging environment 100. For example, the application 186 can include software to communicate with the message processing engine 140 and with an email service such as Outlook, Gmail or Hotmail, or an online social environment like Facebook, Twitter or Chatter.

Social Interface

Figure 2B:
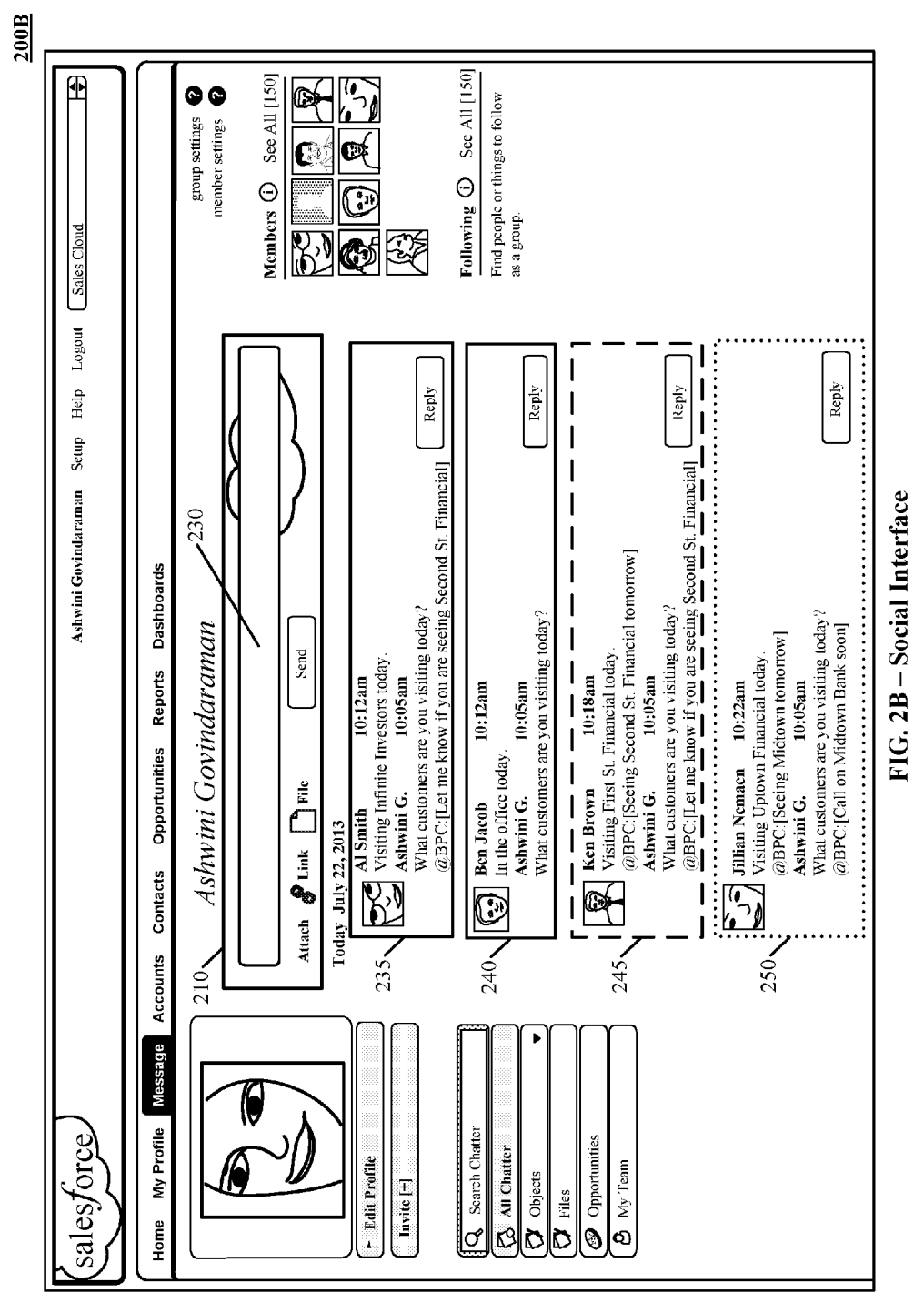

FIGS. 2A-2C are one implementation of a social interface 200A-C of redactive messaging. Social interface 200A-C can include an entry box 210, posts 235, 240, 245, and 250, and private comment 230. In other implementations, social interface 200A-C may not have the same widgets or screen objects as those listed above and/or may have other/different widgets or screen objects instead of, or in addition to, those listed above.

In one implementation, social interface 200A-C can take one of a number of forms, including a dashboard interface, engagement console, and other interface, such as a mobile interface or summary interface. Social interface 200A-C can be hosted on a web-based or cloud-based application running on a computing device such as a personal computer, laptop computer, mobile device, and/or any other hand-held computing device. It can also be hosted on a non-social local application running in an on-premise environment. In one implementation, social interface 200A-C can be accessed from a browser running on a computing device. The browser can be Chrome, Internet Explorer, Firefox, Safari, etc. In another implementation, social interface 200A-C as can run an engagement console on a computer desktop application primarily used for sending redactive messages.

FIG. 2A shows an example of a social interface. The message entry box 210 can be used to enter both public messages and associated private comments as shown in this example. The text "What customers are you visiting today?" is the public message. There are two private comments, one addressed to Ken Brown and Al smith, and another addressed to Jillian Nemaen. Received messages 214 are displayed chronologically in this example.

FIG. 2B is the next screen displayed in this example in which received messages are updated with responses to the private comments sent in FIG. 2A. FIG. 2B shows four responses, two of which include responses to the public message and the private comments. In response, user named 'Al Smith' has responded to the public message with post 235 including text "Visiting Infinite Investors today." As shown in FIG. 2B, Al Smith has not responded to the private comment.

In this example, user named 'Ben Jacob', who was not a recipient of a private comment, responded with post 240 that he is "In the office today." Another user named 'Ken Brown' responded to the public message with the post 245 including text "Visiting First St. Financial today" and with the private comment "Seeing Second St. Financial tomorrow." Finally, user named 'Jillian Nemaen' responded with the post 250 to both the public message and private comment.

Responses to the private comments are identified using identifier "@BPC" and each response is delimited by square brackets according to one implementation. Other identifiers can be used in some implementations, including different text strings such as "#PRIVATE" to identify a private comment, and using parentheses or other special characters to delimit the private comment. In other implementations, private comments can be identified using different colors or fonts.

FIG. 2C is a continuation of the example in FIGS. 2A and 2B that illustrates how a user can respond to a particular received response. In this example, a user named 'Ashwini Govindraman' has clicked on the "Reply" button for response post 245, indicating that she wishes to respond to Ken Brown using a private comment. The message entry box 210 has pre-populated the response with the appropriate prefix since it is known that the user wishes to respond to Ken Brown using a private comment 230. Now the user can enter the desired text and activate the "Send" button to dispatch the private comment 230.

Business Interface

FIG. 3 illustrates a redactive messaging business interface 300 in an online business environment. Business interface 300 includes responses 310, 320, 330, and 340. In other implementations, business interface 300 may not have the same widgets or screen objects as those listed above and/or may have other/different widgets or screen objects instead of, or in addition to, those listed above. For instance, the entire initial message can appear once in the thread with its BPCs, instead of being reproduced for each private thread.

In one implementation, business interface 300 can take one of a number of forms, including a dashboard interface, engagement console, and other interface, such as a mobile interface or summary interface. Business interface 300 can be hosted on a web-based or cloud-based application running on a computing device such as a personal computer, laptop computer, mobile device, and/or any other hand-held computing device. It can also be hosted on a non-social local application running in an on-premise environment. In one implementation, business interface 300 can be accessed from a browser running on a computing device. The browser can be Chrome, Internet Explorer, Firefox, Safari, etc. In another implementation, business interface 300 can run as an engagement console on a computer desktop application primarily used for sending redactive messages.

FIG. 3 is an example of a business interface, in this case using an email interface such as Outlook, Roundcube, Gmail, or Hotmail. The same series of transactions as those in the example of FIGS. 2A-2C are illustrated, except the order is in reverse, showing the most recent messages from the top down. The response from Jillian 310 is the most recent and is shown above the original messages sent by Ashwini. The response 320 from Ken, is likewise shown above Ashwini's original message. Ben's response 330 and Al's response 340 are similar. The value of showing the original message proximal to the response is that context is maintained. The message thread for each sender is indicated and in this example, the viewer can check the boxes to the left of the sender to respond to that sender.

Redactive Messaging Schema

FIG. 4 shows one implementation 400 of a plurality of objects that can be used for managing redactive messaging. As described above, this and other data structure descriptions that are expressed in terms of objects can also be implemented as tables that store multiple record or object types. Reference to objects is for convenience of explanation and not as a limitation on the data structure implementation. FIG. 4 shows a public message objects 420, private message objects 440, recipient objects 460 and user objects 480. In other implementations, implementation 400 may not have the same objects, tables, entries or fields as those listed above and/or may have other/different objects, tables, entries or fields instead of, or in addition to, those listed above.

Public message objects 420 can provide a list of public messages being sent and received among many authors and recipients. It can include columns that specify a thread ID for a related collection of public messages, a message ID for each individual message, a time stamp for each message, an author ID for each message, and the actual content of the public message.

Public message objects 420 can have one or more of the following variables with certain attributes: ThreadID being CHAR(15 BYTE), MessageID being CHAR(15 BYTE), Timestamp being CHAR(15 BYTE), AuthorID being CHAR (15 BYTE) and PublicMessage being TEXT(65535 BYTE).

New entries can be added chronologically with a new record ID, which can be incremented in order. The "thread ID" variable can provide a unique ID for each message thread. The "message ID" variable can provide a unique ID for each message within a thread. The "timestamp" variable can provide the time at which a message is sent. The "author ID" can provide a link to the name of the message author. The "public message" can store the actual message content.

Private message objects 440 can provide a list of private comments with links to their corresponding public message objects. For instance, row 442 links a specific private comment to its parent public message. In particular, the corresponding public message is given by a compound key including a "thread ID" and "message ID": "0123" and "0054" respectively, which map to row 402 in the public message objects 420. The "BPC ID" column in the private message objects 440 shown in the example is used to uniquely identify a private comment. In the example of row 442, the "BPC ID" is "0001." Likewise, row 444 maps the private comment identified having "BPC ID" equal to "0002" to the same row 402 in the public message objects 420.

Private message objects 440 can have one or more of the following variables with certain attributes: ThreadID being CHAR(15 BYTE), MessageID being CHAR(15 BYTE), BPC_ID being CHAR(15 BYTE) and PrivateComments being TEXT(65535 BYTE).

Recipient objects 460 can provide a list of recipients with their corresponding private message objects by using a compound key including a "thread ID" plus a "message ID" plus a "BPC ID." This mapping allows all private comments to be tracked to each of their intended recipients. As can be seen in this example, the first row 464 maps "recipient ID" "1002", Ken Brown to row 482 of the user objects 480 and to the private comment in row 442 of the private message objects 440. Rows 466 and 468 map, respectively, to rows 486 and 488 in the user objects 480. Likewise, rows 466 and 468 map, respectively, to rows 442 and 444 in the private message objects 440.

Recipient objects 460 can have one or more of the following variables with certain attributes: ThreadID being CHAR(15 BYTE), MessageID being CHAR(15 BYTE), BPC_ID being CHAR(15 BYTE) and RecipientID CHAR (15 BYTE).

User objects 480, can provide a list of the recipients with their corresponding user IDs, display names, email addresses, Chatter name, Facebook name, and Twitter name. These names and email addresses can be used to send public messages and private comments to users. The user IDs provide a concise way to link users to specific private message objects as described above for the recipient objects 460.

User objects 480 can have one or more of the following variables with certain attributes: UserID being CHAR(15 BYTE), DisplayName being CHAR(80 BYTE), EmailAddress being CHAR(80 BYTE), ChatterName being CHAR (80 BYTE), FB Name being CHAR(80 BYTE) and TW_Name being CHAR(80 BYTE).

New entries can be added chronologically with a new record ID, which can be incremented in order. The "UserID" variable can provide a unique ID for each recipient and can be synonymous with the RecipientID variable in the recipient objects 460 and "AuthorID" in the public message objects 420. Furthermore, the "UserID" variable can be used to relate all of the other variables, being names and email addresses to entries in the public message objects 420 and the recipient objects 460.

Flowchart of Embedding Private Comments in Public Messages

FIG. 5 illustrates a flowchart 500 of one implementation of embedding private comments in public messages. Other implementations may perform the actions in different orders and/or with different, fewer or additional actions than the ones illustrated in FIG. 5. Multiple actions can be combined in some implementations. For convenience, this flowchart is described with reference to the system that carries out a method. The system is not necessarily part of the method.

Input that represents private comments is received at action 510. The input can include any type of input used in the messaging environment. For instance, in a Chatter environment, the input may consist of text like that shown in FIG. 2A "@BPC:Ken Brown, Al Smith [Let me know if you are seeing Second St. Financial]." In this case, the private comment includes an identifier "@BPC:" which identifies it as a "blind private comment" similar to "BCC:" generally interpreted as "blind complete copy." A single key, menu entry or action can be used to initiate private comment entry in according to one implementation.

At action 515, private comments and intended recipients embedded within the public message are identified. The use of the "@" symbol helps to make private comments unique and easily recognized by both humans and machines. There is also specific syntax used in this example, as shown below:

<PCID><RIDs><start delimiter><comment><end delimiter>

PCID is the private comment identifier, "@BPC" in this example. RIDs are the recipient identifiers, "Ken Brown" and "Al Smith" in this example.

The recipients are given as a list: "Ken Brown, Al Smith." The start and end delimiters that surround the private comment are open "[" and close "]" brackets. The message content is included between the delimiters. Other syntax arrangements are possible, for instance using a different identifier for the PCID and different start and end delimiters. In some implementations, different fonts and colors may be used. In yet other implementations, the delimiters may be made more implicit, by automatically setting the end of a comment at the end of a line or paragraph.

At action 520, the private comments can be linked with their intended recipients. Recipients can be identified using their display names as in the above example, by their handles in an environment which provides ongoing comment and information feeds, by their email addresses, by usernames, by tags, and by social handles, etc. Private comments that correspond to particular recipients can be associated with these recipients by using delimiters that follow the recipient identifiers as in the above example. In another implementation this can be done by using additional identifiers that link recipients to their corresponding comments. This allows specific private comments to be restricted to specific recipients. The identifiers can direct the private comments to restricted recipients via active hyper-links, allowing the restricted recipients to access additional private information. In some implementations, selecting the active hyper-links can immediately open a website, document, image, or video.

At action 525, private comments can be directed privately to their corresponding recipients. This can be done by removing private comments from a public message and sending that version of the public message to all recipients who are not restricted recipients of the private comments. Then, the private comments for restricted recipients can be embedded, or left in place, in the message as sent to particular recipients. Thus, there can be many versions of a public message with embedded private comments. Each version can be sent to only those recipients for whom it is intended, based on the links created between the private comments and restricted recipients in action 520.

At action 530, a user interface application that visually distinguishes private comments can be provided. This can be done by using font enhancements like italics or bold lettering, or increasing font size, or using a font color that differs from the surrounding text.

At action 535, the public message can be formatted to remove the blank spaces resulting from excising the private comments. This can result in rendering the public message such that it is not apparent to a viewer that private comments were inserted for other viewers.

Flowchart of Posting Private Comments in Online Social Environments

FIG. 6 is a flowchart 600 of one implementation of posting private comments in online social environments. Other implementations may perform the actions in different orders and/or with different, fewer or additional actions than the ones illustrated in FIG. 6. Multiple actions can be combined in some implementations. For convenience, this flowchart is described with reference to the system that carries out a method.

Electronic messaging systems can be passive in nature. While online social environments are more interactive and instantaneous in terms of responses or reaction times. The system is not necessarily part of the method. FIG. 6 shows use of private comments in online social environments like Chatter, Facebook, Twitter, and the like as opposed to their use in electronic messaging systems like Outlook, Gmail, Roundcube, Hotmail, etc. illustrated in FIG. 5.

At action 610, a request to post a feed item is received. This request can take many forms and can be specific to the online social environment. For instance, in a web-based environment it can be received as an HTTP request.

At action 615, private comments and intended recipients embedded within the feed item are identified. This can be done as described in action 515 above using the "@" symbol and specific syntax as used in this example, as shown below:

<PCID><RIDs><start delimiter><comment><end delimiter>

PCID is the private comment identifier, "@BPC" in this example. RIDs are the recipient identifiers, "Ken Brown" and "Al Smith" in this example.

The recipients are given as a list: "Ken Brown, Al Smith." The start and end delimiters that surround the private comment are open "[" and close "]" brackets. The message content is contained between the delimiters. Other syntax arrangements are possible, for instance using a different identifier for the PCID and different start and end delimiters. In some implementations, different fonts and colors may be used. In yet other implementations, the delimiters may be made more implicit, by automatically setting the end of a comment at the end of a line or paragraph. Yet other alternatives for are possible and will be apparent to those skilled in the art.

At action 620, the private comments can be linked with their intended recipients. Recipients can be identified using their display names as in the above example, by their handles in an environment which provides ongoing comment and information feeds, by their email addresses, by usernames, by tags, etc. Private comments that correspond to particular recipients can be associated with these recipients by using delimiters that follow the recipient identifiers as in the above example. In another implementation this can be done by using additional identifiers that link recipients to their corresponding comments. This allows specific private comments to be restricted to specific recipients.

At action 625, private comments can be directed privately to their corresponding recipients. This can be done by removing all private comments from a public message and sending that version of the public message to all recipients who have no associated private comments. Then, private comments for restricted recipients can be embedded, or left in place, in the message as sent to particular recipients. Thus, there may be many versions of a public message with embedded private comments. Each version can be sent to only those recipients for whom it is intended, based on the links created between the private comments and intended recipients in action 620.

At action 630, the private comments can be embedded in a profile feed. This can be done by noting that the profile is that of a recipient intended to receive a private comment, and inserting the private comment in that recipient's profile feed. Similarly, recipients not intended to receive a specific private comment may not have that comment embedded into their profile feed.

At action 635, a similar approach can be used as in action 630: private comments intended for specific recipients can be embedded into their individual versions of the feeds and omitted from versions sent to other recipients.

At action 640, a version of a public feed without private comments can be reformatted to remove blank spaces that could remain after removing the private comments.

At action 645, authoring of private comments in a first online social environment can be supported. This can be accomplished by using an application programming interface provided by the online environment or by providing a custom application that interfaces with the first online social environment.

At action 650, a feed item posted in a first online social environment can be cross-posted in a second online environment. This can be done by linking the two social environments. For instance, Twitter offers an interface that can automatically forward any Twitter posts to Facebook. Conversely, cross-posting can be done manually. For proprietary online social environments, cross-posting can be done using custom scripts or interfaces.

At action 655, threaded private conversations can be supported among intended recipients of private comments. For instance, in the example given in FIG. 2A, Ashwini Govindaraman sends a private comment to Al Smith and Ken Brown. Thus, whenever Al or Ken responds, a threaded private conversation can be instantiated. This private conversation can take place among these three people. If Al responds, his message can be sent to Ken and Ashwini. Likewise, if Ken responds, his message can be sent to Al and Ashwini. Furthermore, the message can be associated with the thread corresponding to the original public message so that the threaded private conversation retains its original context. The details of threaded private conversations can be maintained as part of a schema as described for FIG. 4.

Flowchart of Privately Appreciating Content Posted in an Online Social Environment FIG. 7 is a flowchart 700 of one implementation of privately appreciating content posted in an online social environment. Other implementations may perform the actions in different orders and/or with different, fewer or additional actions than the ones illustrated in FIG. 7. Multiple actions can be combined in some implementations. For convenience, this flowchart is described with reference to the system that carries out a method. The system is not necessarily part of the method.

FIG. 7 relates to private posting of non-textual appreciative feed items as opposed to textual private comments described in FIG. 5 and FIG. 6. Appreciative feed items are emoticons, likes, stars, thumbs up, bonuses, ratings, badges or rating metrics. In one implementations, appreciative feed items can be posted to initiate message threads or in response to previously posted feed items as expressions of opinions of a poster.

At action 710, a request to post a feed item that appreciates content is received. This request can take many forms and is specific to the environment. For instance, in a web-based environment it may arrive as an HTTP request. Another implementation can use an application 186 as in FIG. 1 running on a user computing device 185, to receive a request from a user.

At action 715, the feed item and its intended viewers are identified. This can be done by simply allowing the viewers to be given as a list that precedes the feed item content as in the "TO:" line of an email or it can be entered into a text box intended for this purpose. Viewers can be identified by using their display names, by their handles in an environment which provides information feeds, by their email addresses, by usernames, by tags, etc. Thus, the feed item and its viewers are readily identified and linked with each other.

At action 720, the feed item that appreciates content can be privately posted to the intended viewer's profile on which the content was originally posted. This can be done by noting that the profile is that of a recipient intended to receive the private appreciation, and inserting the private appreciation in that recipient's profile feed. Similarly, recipients not intended to receive a specific private appreciation may not have that appreciation embedded into their profile feed.

At action 725, the feed item can be created in a second online social environment via using an interface provided specifically for that purpose by the second online social environment. Twitter and Facebook provide interfaces for this purpose and for use in cross-posting.

At action 730, the feed item from the first online social environment can be cross-posted in a second online social environment. Again, environments like Twitter and Facebook provide interfaces for this purpose.

Computer System

FIG. 8 is a block diagram of an example computer system 800 for redactive messaging. FIG. 8 is a block diagram of an example computer system, according to one implementation. Computer system 810 which typically includes at least one processor 814 that communicates with a number of peripheral devices via bus subsystem 812. These peripheral devices can include a storage subsystem 824 including, for example, a memory subsystem 826 and a file storage subsystem 828, user interface input devices 822, user interface output devices 820, and a network interface subsystem 816. The input and output devices allow user interaction with computer system 810. Network interface subsystem 816 provides an interface to outside networks, including an interface to corresponding interface devices in other computer systems.

User interface input devices 822 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 810.

User interface output devices 820 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 810 to the user or to another machine or computer system.

Storage subsystem 824 stores programming and data constructs that provide the functionality of some or all of the modules and methods described herein. These software modules are generally executed by processor 814 alone or in combination with other processors.

The memory subsystem 826 used in the storage subsystem 824 can include a number of memories including a main random access memory (RAM) 834 for storage of instructions and data during program execution and a read only memory (ROM) 832 in which fixed instructions are stored. A file storage subsystem 828 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 828 in the storage subsystem 824, or in other machines accessible by the processor.

Bus subsystem 812 provides a mechanism for letting the various components and subsystems of computer system 810 communicate with each other as intended. Although bus subsystem 812 is shown schematically as a single bus, alternative implementations of the bus subsystem can use multiple busses.

Computer system 810 can be of varying types including a workstation, server, computing cluster, blade server, server farm, or any other data processing system or computing device. Due to the ever-changing nature of computers and networks, the description of computer system 810 depicted in FIG. 8 is intended only as one example. Many other configurations of computer system 810 are possible having more or fewer components than the computer system depicted in FIG. 8.

Particular Implementations

In one implementation, a method is described from the perspective of a system receiving messages from user software. The method includes addressing private comments to restricted recipients in a context of a public message. It includes receiving input that represents private comments embedded in a public message during authoring of the public message. It also includes identifying the private comments and restricted recipients of the private comments using identifiers that link the private comments with the restricted recipients. It further includes directing the private comments privately to the restricted recipients when the public message is dispatched.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as redactive messaging environment, social interface, business interface, redactive messaging schema, etc.

The method further includes providing a user interface application that visually distinguishes the private comments embedded in the public message from public comments which can include a user interface application that displays the private comments and any private responses as one or more supplemental threads. These identifiers, when displayed in a user interface application, can actively hyperlink the private comments to the restricted recipients at various electronic messaging systems. The method further includes using identifiers that include at least tags, usernames and handles.

The method further includes formatting the public message without blank spaces where a private comment has been removed, whereby it is not apparent to viewers who are not the restricted receipts of the private comments where the private comments were embedded. It also includes forwarding of the public message by the restricted recipients without forwarding the private comments, unless an addressee of forwarded public message was also one of the restricted recipients.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In another implementation, a method is described from the perspective of a system receiving messages from user software. The method includes privately commenting on a public feed item posted in an online social environment. The method includes receiving a request to post a feed item that includes private comments authored in response to a public feed item posted in an online social environment. It includes identifying private comments and intended recipients of the private comments using identifiers that link the private comments with their intended recipients. It also includes directing the private comments privately to the intended recipients when the feed item is posted in the online social environment.

This method and other implementations of the technology disclosed can include one or more of the following features and/or features described in connection with additional methods disclosed.

The method further includes supporting authoring of the private comments in a first online social environment and cross-posting the feed item that includes the private comments in a second online social environment by using identifiers that are specific to the second online social environment. It also includes supporting threaded private conversations with the intended recipients when they respond to the private comments.

The method further includes embedding private content in a profile feed of a user by receiving a feed item that holds private content addressed to a user with a profile feed in the online social environment. It includes that the profile feed is a stream of feed items posted on a user's profile at the online social environment. It also includes linking the private content with the user's profile using identifiers that identify the private content and the user. It further includes privately posting the feed item in the profile feed of the user so that the feed item is viewable only to the user.

The method further includes supporting creation of the feed item that holds the private content in a first online social environment and cross-posting the feed item in a user's profile at a second online social environment by using identifiers that are specific to the second online social environment.

The method further includes embedding private comments in the public feed item by receiving input that represents private comments embedded in a public feed item during authoring of the public feed item. It includes identifying the private comments and intended recipients of the private comments by using identifiers that link the private comments with their intended recipients. It also includes directing the private comments privately to the intended recipients when the public feed item is dispatched. It further includes formatting text of the public feed item without blank spaces where a private comment has been removed, whereby it is not apparent to viewers who are not the restricted receipts of the private comments where the private comments were embedded.

The method further includes forwarding of the public feed item by the intended recipients of the private comments does not forward the private comments, unless an address of forwarded public feed item was also that of an intended recipient of the private comments. It includes identifiers including at least tags, usernames and handles. It also includes identifiers that are links to accounts that represent the intended recipients at various online social environments.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In yet another implementation, a method is described from the perspective of a system receiving messages from user software. The method includes privately appreciating content posted in an online social environment. It includes receiving a request to post a feed item that appreciates content posted in an online social environment. It also includes identifying the feed item and intended viewers of the feed item using identifiers that link the feed item with its intended recipients and privately posting the feed item in profile feeds of the intended recipients so that the feed item is viewable only to the intended recipients. It further includes identifiers including at least tags, usernames and handles.

This method and other implementations of the technology disclosed can include one or more of the following features and/or features described in connection with additional methods disclosed.

This method further includes supporting creation of the feed item in a second online social environment that appreciates content originally posted in a first online social environment and cross-posting the feed item in the first online social environment by using identifiers that are specific to the first online social environment. It also includes identifiers including at least tags, usernames and handles.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

While the present technology is disclosed by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

The invention claimed is:

1. A method of addressing private comments to restricted recipients in a context of a public message, the method including:
providing a user interface application installed and running within a user computing device that
visually distinguishes private comments embedded inline with public comments by tagging of the private comments within a message entry area shared by the private and public comments and
uses the tagging of the private comments to link the private comments with the restricted recipients to whom they are directed;
receiving input that represents private comments embedded in a public message, which is directed to more recipients than the private comments are directed to, during authoring of the public message; and
directing the private comments privately to the restricted recipients when the public message is dispatched.

2. The method of claim 1, wherein the user interface application displays the private comments and any private responses as one or more supplemental threads.

3. The method of claim 1, wherein identifiers of the restricted recipients include at least typed tags and typed usernames or user handles.

4. The method of claim 1, wherein the identifiers, when displayed in a user interface application, actively hyper-link the private comments to the restricted recipients at various electronic messaging systems.

5. The method of claim 1, further including:
formatting the public message without blank spaces where a private comment has been removed, whereby it is not apparent to viewers who are not the restricted recipients of the private comment where the private comment was embedded.

6. The method of claim 1, wherein forwarding of the public message by the restricted recipients does not forward the private comments, unless an addressee of forwarded public message was also one of the restricted recipients.

7. A method for privately commenting on a public feed item posted in an online social environment, the method including:
providing a user interface application installed and running within a user computing device that
visually distinguishes private comments embedded inline with public comments by tagging of the private comments within a message entry area shared by the private and public comments;
receiving a request to post a feed item that includes private comments authored in response to a public feed item, which is directed to more recipients than the private comments are directed to, posted in an online social environment; and directing the private comments privately to the intended recipients when the feed item is posted in the online social environment.

8. The method of claim 7, further including supporting authoring of the private comments in a first online social environment; and cross-posting the feed item that includes privately delivering the private comments in a second online social environment by using identifiers that are specific to the second online social environment.

9. The method of claim 7, further including:

supporting threaded private conversations with the intended recipients when they respond to the private comments.

10. The method of claim 7, further including embedding private content in a profile feed of a user by:

receiving a feed item that holds private content addressed to a user with a profile feed in the online social environment, wherein the profile feed is a stream of feed items posted on a user's profile at the online social environment;

linking the private content with the user's profile using identifiers that identify the private content and the user; and privately posting the feed item in the profile feed of the user so that the feed item is viewable only to the user.

11. The method of claim 10, further including supporting creation of the feed item that holds the private content in a first online social environment; and cross-posting the feed item privately in a user's profile at a second online social environment by using identifiers that are specific to the second online social environment.

12. The method of claim 7, further including embedding private comments in the public feed item by:

receiving input that represents private comments embedded in a public feed item during authoring of the public feed item;

wherein the private comments and intended recipients of the private comments are identified using identifiers that link the private comments with their intended recipients; and directing the private comments privately to the intended recipients when the public feed item is dispatched.

13. The method of claim 12, further including:

formatting text of the public feed item without blank spaces where a private comment has been removed, whereby it is not apparent to viewers who are not the intended recipients of the private comments where the private comments were embedded.

14. The method of claim 12, wherein forwarding of the public feed item by the intended recipients of the private comments does not forward the private comments, unless an address of forwarded public feed item was also that of an intended recipient of the private comments.

15. The method of claim 12, wherein the identifiers include at least typed tags and typed usernames or user handles.

16. The method of claim 7, wherein the identifiers are links to accounts that represent the intended recipients at various online social environments.

* * * * *